US012663808B2

(12) United States Patent     (10) Patent No.:   US 12,663,808 B2

Xi et al.     (45) Date of Patent:   Jun. 23, 2026

(54) REACTIVE COLLISION AVOIDANCE FOR AUTONOMOUS VEHICLES CONSIDERING PHYSICAL CONSTRAINTS

(71) Applicant: Rutgers, The State University of New Jersey, New Brunswick, NJ (US)

(72) Inventors: Zhimin Xi, Basking Ridge, NJ (US); Elnaz Asghari Torkamani, North Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 218 days.

(21) Appl. No.: 18/288,537

(22) PCT Filed: Apr. 28, 2022

(86) PCT No.: PCT/US2022/026764

§ 371 (c)(1),
(2) Date: Oct. 26, 2023

(87) PCT Pub. No.: WO2022/232415

PCT Pub. Date: Nov. 3, 2022

(65) Prior Publication Data

US 2024/0210958 A1     Jun. 27, 2024

Related U.S. Application Data

(60) Provisional application No. 63/180,852, filed on Apr. 28, 2021.

(51) Int. Cl.
| | |
|---|---|
| *G05D 1/633* | (2024.01) |
| *G05D 1/65* | (2024.01) |
| *G05D 1/693* | (2024.01) |

(52) U.S. Cl.
CPC .............. *G05D 1/633* (2024.01); *G05D 1/65* (2024.01); *G05D 1/693* (2024.01)

(58) Field of Classification Search
CPC .......... G05D 1/633; G05D 1/65; G05D 1/693; G05D 1/0214; B60W 2554/4041; B60W 2720/10; B60W 60/0015; B60W 30/08

(Continued)

(56) References Cited

U.S. PATENT DOCUMENTS

| | | |
|---|---|---|
| 7,957,858 B1 | 6/2011 | Larson et al. |
| 10,884,430 B2 | 1/2021 | Kumar et al. |

(Continued)

OTHER PUBLICATIONS

Fox, D. et al., "The Dynamic Window Approach to Collision Avoidance," IEEE Robotics & Automation Magazine. Mar. 1997;4(1), pp. 1-23.

(Continued)

*Primary Examiner* — Madison R. Inserra
*Assistant Examiner* — Hussam Aldeen Alzateemeh
(74) *Attorney, Agent, or Firm* — Lerner David LLP

(57) ABSTRACT

A first robot performs navigation to a predetermined first static or dynamic target location. A first set of velocity candidates is generated for the first robot based on the detection of a first set of one or more velocity obstacles. A first new velocity is selected from the first set of velocity candidates. The first robot is moved at a first velocity corresponding to the first new velocity. The first new velocity is a first desired velocity or a velocity closest to the first desired velocity when at least one velocity candidate of the first set of velocity candidates corresponds to a safe and reachable velocity for the first robot. The first new velocity is a minimum velocity possible by the first robot when each one of the first set of velocity candidates corresponds to a respective unsafe velocity for the first robot.

20 Claims, 9 Drawing Sheets

(58) Field of Classification Search
USPC ........................................................ 701/301
See application file for complete search history.

(56) References Cited

U.S. PATENT DOCUMENTS

| | | | |
|---|---|---|---|
| 2014/0148989 A1 | 5/2014 | Ueda et al. | |
| 2015/0284010 A1* | 10/2015 | Beardsley | G08G 5/57 |
| | | | 701/1 |
| 2018/0200891 A1* | 7/2018 | Erickson | G05D 1/0214 |
| 2019/0094866 A1* | 3/2019 | Moore | G05D 1/0289 |
| 2019/0108764 A1* | 4/2019 | Fragoso | G08G 5/723 |
| 2020/0041274 A1 | 2/2020 | Lalonde et al. | |
| 2020/0180634 A1 | 6/2020 | Hammoud | |
| 2020/0310444 A1 | 10/2020 | Hasegawa et al. | |
| 2021/0053557 A1 | 2/2021 | Costa et al. | |
| 2021/0061269 A1 | 3/2021 | Petroff et al. | |

OTHER PUBLICATIONS

International Search Report and Written Opinion issued in Appln. No. PCT/US2022/026764 mailed Aug. 30, 2022 (13 pages).

International Search Report and Written Opinion issued in Appln. No. PCT/US2022/47693 mailed Jan. 31, 2023 (21 pages).

Hadwiger, Hugo, "Minkowskische Addition und Subtraktion beliebiger Punktmengen und die Theoreme von Erhard Schmidt," Math. Z., 53 (3): 210-218, doi:10.1007/BF01175656. [The concise expanation is provided in paragraphs [0045] and [0046] on pp. 9 and 10.].

LaValle, S. M. "Planning Algorithms," Cambridge University Press, Copyright Steven M. LaValle 2006, [See, especially, Part IV: Planning Under Differential Constraints, pp. 711-924.].

* cited by examiner next time step velocity next time step velocity

REACTIVE COLLISION AVOIDANCE FOR AUTONOMOUS VEHICLES CONSIDERING PHYSICAL CONSTRAINTS

CROSS-REFERENCE TO RELATED APPLICATIONS

The present application is a national phase entry under 35 U.S.C. § 371 of International Application No. PCT/US2022/026764 filed on Apr. 28, 2022, and published as International Publication No. WO 2022/232415 A1, which claims the benefit of the filing date of U.S. Provisional Patent Application No. 63/180,852, filed on Apr. 28, 2021, the disclosures of all of which are hereby incorporated herein by reference in their entireties.

BACKGROUND

An autonomous vehicle must be able to follow a clear path towards its destination by anticipating the imminent behavior of moving obstacles and computing a safe driving path. The problem of autonomous navigation in a dynamic environment is a challenging task, especially when the motion of the elements populating the environment is unknown in advance and must be updated in real-time. Within such a highly dynamic environment, a robot of interest must compute and execute a motion to be made in a bounded time or risk a collision by taking no action. This limited available time to plan a motion is a function of the nature and the dynamics of the environment and imposes a hard constraint on the navigation of autonomous vehicles and other robots. Finding a collision-free path is important in many robotics applications including marine, aerospace, and multi-agent robotics production systems as well as in the planet exploration and mining industries. The issues associated with navigation are not only of interest in autonomous robots but also apply to crowd simulation in computer graphics and virtual environments, video gaming, architecture design, and traffic engineering, where each entity may be considered as a virtual human or a moving car. In many of these applications, the autonomous agent may be operating in an unknown dynamic environment with the main goal being to have the robot recognize free directions that lead the robot toward its goal safely without a collision with any obstacles.

Motion planning (MP) is an important primitive for autonomous mobile robots. MP techniques allow a robot to determine a collision-free speed and turning command at every time step from a starting point to a goal point. The major objectives of these techniques are to optimize performance criteria such as distance, time, or energy. Based on the availability of information about the environment, MP techniques may be classified into two major categories, the "deliberative approaches" and the "reactive approaches." In deliberative approaches, the determination of a complete plan is based on prior known information about the stationary and moving obstacles. In reactive approaches, decisions are made from real-time data by means of sensors while the robot moves across its environment.

Reactive motion planning has received more attention in recent times since autonomous mobile robots must be capable of operating in dynamic environments. The first of these approaches was introduced by Khatib (1986) and was named the Artificial Potential Field (APF) approach. In this approach, a robot moves under the influence of an APF while obstacles are generating repulsive forces and the target is generating attractive forces. Another approach is the vector field histogram approach proposed by Borenstein and Koren (1991). In this approach at every moment of time, a polar histogram is developed to represent the polar density of the obstacles around a robot. Another reactive approach for obstacle avoidance is called dynamic windows (DW) developed by Fox et al., (1997). In this approach, a set of feasible linear and angular velocities based on acceleration capability of robot is elaborated in every time step. Generally, the DW approach includes first generating a valid search space and second selecting an optimal solution in this search space. Another commonly used reactive approach is the velocity obstacle (VO) approach proposed by Fiorini and Shiller (1998). In this approach, the velocities of the robot that will cause a collision between the robot and the obstacles at some moment in time if the obstacles maintain their current velocity is determined. In brief, if the robot chooses a velocity inside the velocity obstacle then the robot and the obstacle will eventually collide, but if the robot chooses a velocity outside the velocity obstacle, such a collision is guaranteed not to occur.

There are two main philosophies for addressing the MP problem in formulation based on the configuration-space idea, "sampling-based methods" and "combinatorial methods." Early sampling-based approaches applicable to simple or car-like robots were developed for complete trajectory planning among moving obstacles. Although these algorithms were successful in recent years for solving problems from robotics, manufacturing, and biological applications that involve geometric primitives, they failed to guarantee collision avoidance. In combinatorial approaches, paths are found through the continuous configuration space without resorting to approximations. Due to this property, they are alternatively referred to as exact approaches. This means that for any set of obstacles within an environment for which the approach is configured to address, the approach will either find a solution or will correctly report that no solution exists. However, even with an essentially asymptotic running time, these approaches are nearly impossible to implement.

Among motion planning approaches, the VO approach is one of the dynamic obstacle avoidance approaches capable of actively avoiding obstacles in real time. This approach is a first-order method of motion planning that takes robot and obstacle velocities directly into account to avoid collisions in a time-varying environment. In approach, velocity candidates consisting of all robot velocities that will lead to a collision with an obstacle, based on a velocity of the obstacle are determined as shown in the example demonstrated by the flow chart of FIG. 1. Among all reactive motion planning approaches, the VO approach is a commonly used approach and includes choosing avoidance velocities in order to avoid colliding with static or dynamic obstacles. Although this approach is capable and adaptive to various unknown environments, the VO approach fails to identify a safe velocity within the limited time constraints of more complex environments.

Therefore, there is a need to more promptly find a safe and collision free velocity for a robot within highly dynamic environments without using any computationally expensive methods such as optimization, sampling, or decision-based approaches.

BRIEF SUMMARY OF THE DISCLOSURE

Any robot motion planning and control process must face a safety issue: is it guaranteed that the robot will never end up in a situation yielding an inevitable collision? Under the Inevitable Collision State (ICS) rubric, an ICS for a robotic system is a state for which, regardless of the future trajectory followed by the system, a collision with an obstacle will eventually occur.

In accordance with an aspect of the disclosure, a robot motion planning and control process may be applied to a robot to avoid an ICS. In this process, once a new velocity for a robot has been selected, a determination may be made as to whether such new velocity is reachable, i.e., within physical constraints of the robot, and safe, i.e., out of collision space. Computations may be made via a microprocessor microcontroller applying an algorithm to generate reachability and safety indices. More specifically, in the robot motion planning and control process, checking whether a motion is ICS-free or not is carried out by defining the safety index for all potentially acceptable next step motion candidates. However, this determination may result in potential new velocities which are reachable but not safe in a first case or safe but not reachable in a second case. In the first case, the robot may slow down at the intersection of several obstacles where no safer velocity is possible. In the second case, the robot may explore within the potential velocity space and select one admissible (safe) velocity which is close enough to its best option. In both cases, depending upon the speed of the robot, there may be a region of states for which the robot will not have the time to brake and avoid collision, e.g., due to a hardware failure. However, such ICS can be theoretically eliminated by defining proper safety distance based on the speed of the robots/vehicles. The framework of velocity obstacle provides a suitable framework to establish the relation of the collision states and the dynamic constraints in order to have strong safety guarantees.

In general, only randomized motion planning processes can deal with complex and/or highly dynamic robotic systems. Such processes lack a bounded running time as there is no guarantee that a safe motion may be computed within the available limited time to select a computed motion and make a motion corresponding to the computed motion. In this regard, a dynamic obstacle avoidance system must be able to work properly under some other constraints and specifications related to the characteristics of a robot, e.g., an autonomous vehicle, which may include an acceleration and rotation angle of the robot.

Another aspect of the disclosure is a process of navigation by a first robot to a predetermined first static or dynamic target location. In this process, a first set of velocity candidates for the first robot may be generated via a first computer processor of the first robot based on the detection of a first set of one or more velocity obstacles. A first new velocity may be selected via the first computer processor from the first set of velocity candidates. The first robot may be moved at a first velocity corresponding to the first new velocity. The first new velocity may be a first desired velocity or a velocity closest to the first desired velocity when at least one velocity candidate of the first set of velocity candidates corresponds to a safe and reachable velocity for the first robot. The first new velocity may be a minimum velocity possible by the first robot when each one of the first set of velocity candidates corresponds to a respective unsafe velocity for the first robot.

Another aspect of the disclosure is a process of navigation by a first robot to a predetermined first static or dynamic target location. In this process, a first set of velocity candidates for the first robot may be generated via a first computer processor of the first robot based on the detection of a first set of one or more velocity obstacles. The process may also include determining, via the first computer processor of the first robot, whether each of the first set of velocity candidates is a safe and reachable velocity for the first robot or an unsafe velocity for the first robot. A first new velocity may be selected via the first computer processor from the first set of velocity candidates. The first robot may be moved at a first velocity corresponding to the first new velocity. The first new velocity may be a minimum velocity candidate of the first set of velocity candidates corresponding to a first desired velocity or a velocity closest to the first desired velocity when the first new velocity corresponds to a determined safe and reachable velocity for the first robot. The first new velocity may be a minimum velocity possible by the first robot when each one of the first set of velocity candidates are determined to be unsafe velocities for the first robot In some arrangements of the process, the velocity candidates of the first set of velocity candidates may correspond to potentially acceptable velocities of the first robot.

In some arrangements, the presence of the first set of velocity obstacles may be detected with a first obstacle detection sensor of the first robot. In such arrangements, the first set of velocity candidates may be generated when the first obstacle detection sensor detects the presence of the first set of velocity obstacles. In some arrangements, the first set of velocity candidates for the first robot may be generated only when at least one velocity obstacle of the first set of velocity obstacles is detected to be within a preset distance from the first robot. In some arrangements, the first set of velocity candidates for the first robot may be generated only when the first set of velocity obstacles detected includes more than one velocity obstacle.

In some arrangements of the process, a first set of reachable velocities may be generated, via the first computer processor, for the first robot when each one of the first set of velocity candidates corresponds to a respective safe but unreachable velocity for the first robot. In such arrangements, the first new velocity may be a velocity corresponding to a velocity candidate of the first set of velocity candidates in which the corresponding velocity candidate may be determined, via the first computer processor using a preset algorithm, to correspond to a velocity closest to the first desired velocity.

In some arrangements of the process, the location of the first set of velocity obstacles may be detected. In such arrangements, collision cones based on the location of the first set of velocity obstacles may be determined to ascertain the first set of velocity candidates. In some arrangements, the location of the first set of velocity obstacles detected may be considered a real-time location of the velocity obstacles.

In some arrangements of the process, whether each one of the first set of velocity candidates for the first robot is safe and reachable by the first robot may be determined. In some such arrangements, the determination of whether each one of the first set of velocity candidates is safe and reachable by the first robot may include calculating, via the computer processor of the first robot, safety and reachability indices using preset algorithms.

In some arrangements of the process, the minimum velocity possible by the first robot may be greater than zero.

In some arrangements of the process, at least one velocity obstacle of the first set of velocity obstacles of the velocity obstacles may be a second robot identical or substantially identical to the first robot.

In some arrangements of the process, the first robot may be an autonomous vehicle. In some such arrangements, the autonomous vehicle may be intended for travel on either one or both of roadways and other terrain. In some such arrangements, the autonomous vehicle may be intended for either one or both of air travel and sea travel.

In some arrangements of the process, the first robot may be a first non-holonomic agent. The generating of the first set of velocity candidates may include determining candidate sets of kinematic values each comprising a respective candidate translational velocity value, a respective candidate rotational velocity value, and a respective candidate angular value providing a possible directional heading for the first robot. Each of the sets of kinematic values may be based on a kinematics model for the non-holonomic agent. The process may also include reducing the candidate sets of kinematic values to only such candidate sets of kinematic values reachable for the first robot if the first robot were a holonomic agent.

In accordance with an aspect of the disclosure, a robot collision avoidance system may include a first robot and a second robot. The first robot may be configured for performing a navigation by a first robot to a predetermined first static or dynamic target location. In this process, a first set of velocity candidates for the first robot may be generated via a first computer processor of the first robot based on the detection of a first set of one or more velocity obstacles. A first new velocity may be selected via the first computer processor from the first set of velocity candidates. The first robot may be moved at a first velocity corresponding to the first new velocity. The first new velocity may be a first desired velocity or a velocity closest to the first desired velocity when at least one velocity candidate of the first set of velocity candidates corresponds to a safe and reachable velocity for the first robot. The first new velocity may be a minimum velocity possible by the first robot when each one of the first set of velocity candidates corresponds to a respective unsafe velocity for the first robot. The second robot may be configured for performing a process of navigation by the second robot to a predetermined second static or dynamic target location. The second robot may be one of the velocity obstacles of the first set of velocity obstacles. In the process of navigation by the second robot, a second set of velocity candidates for the second robot may be generated via a second computer processor of the second robot based on the detection of a second set of one or more velocity obstacles in which the second set of velocity obstacles may include the first robot. In the process of navigation by the second robot, a second new velocity may be selected, via the second computer processor, from the second set of velocity candidates. In the process of navigation by the second robot, the second robot may be moved at a velocity corresponding to the second new velocity. The second new velocity may be a second desired velocity or a velocity closest to the second desired velocity when at least one velocity candidate of the second set of velocity candidates corresponds to a safe and reachable velocity for the second robot. The second new velocity may be a minimum velocity possible by the second robot when each one of the second set of velocity candidates corresponds to a respective unsafe velocity for the second robot.

In some arrangements of the system, the first robot may be a first non-holonomic agent. The generating of the first set of velocity candidates may include determining candidate sets of kinematic values each comprising a respective candidate translational velocity value, a respective candidate rotational velocity value, and a respective candidate angular value providing a possible directional heading for the first robot. Each of the sets of kinematic values may be based on a kinematics model for the non-holonomic agent. The process may also include reducing the candidate sets of kinematic values to only such candidate sets of kinematic values reachable for the first robot if the first robot were a holonomic agent.

BRIEF DESCRIPTION OF THE DRAWINGS

By way of description only, embodiments of the present disclosure are described herein with reference to the accompanying figures, in which.

DETAILED DESCRIPTION

Modeling of the Environment

Figure 1:
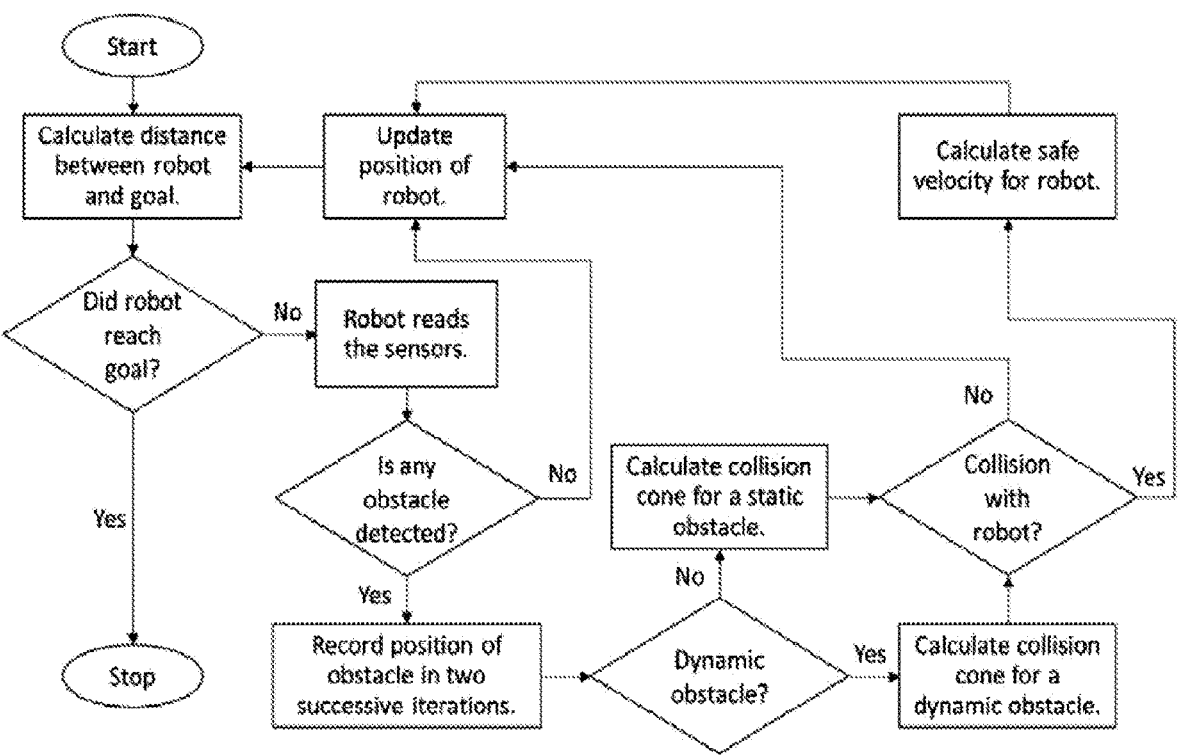
FIG. 1 is a process flow diagram for a velocity obstacle approach in accordance with the prior art.
Figure 2:
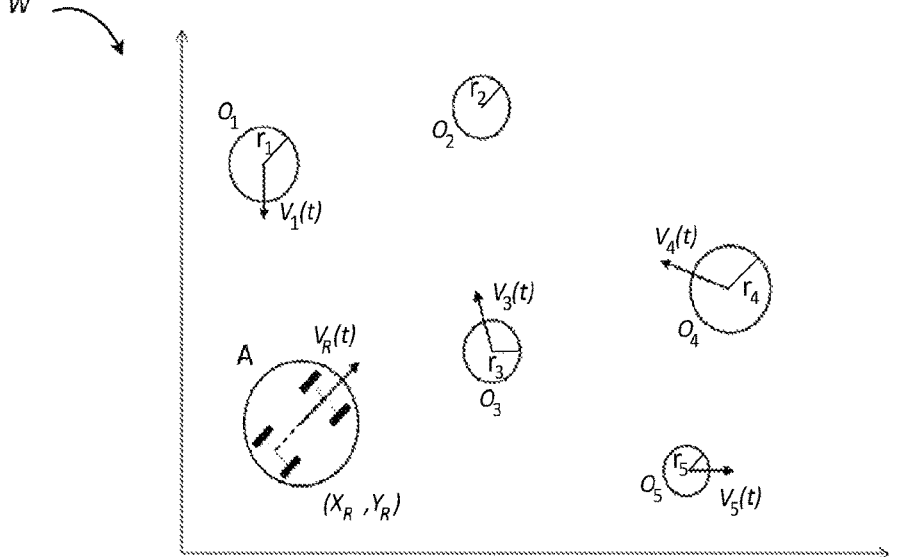
FIG. 2 is a model of a global environment that includes a robot and static and dynamic obstacles.

Referring now to the drawings, in one example model, a two-dimensional world space W is defined as having a radius $\mathbb{R}$ such that $W=\mathbb{R}^2$. As shown in FIG. 2, in this example, world space W includes robot A, which may be an autonomous robot, and a set of obstacles $O_1$-$O_5$ which are subsets of the world space and form highly dynamic dense environment. For simplicity, the robot is modeled geometrically and is controllable via a motion plan, and each obstacle is an object within world space W that either "permanently" occupies the world space, e.g., a building or other permanent or semi-permanent fixture, or temporarily occupies the world space, e.g., as in the examples of pedestrians, vehicles, or moving robots such as autonomous vehicles. In reality, obstacles come in all shapes and sizes, but in the interest of aiding understanding, any polygon obstacle may be replaced with a circle to simplify the geometry modeling.

Accordingly, In this example, robot A is modeled as a disc-shaped holonomic agent having $p_A$, $r_A$, and $v_A$ as its position, radius, and velocity, respectively, and each of obstacles $O_1$-$O_5$, which are either static or dynamic, are also modeled as disc-shaped agents having $p_B$, $r_B$, and $v_B$ as their positions, radii, and velocities, respectively, in which B is a variable representing the respective obstacle number and static obstacles are shown without a velocity. For robot A and a given obstacle B, the velocity obstacle $$VO_B^A(v_B)$$

is defined as the set of velocities for robot A that would result in a collision with B at time $t \geq T$ in which T is the present time, i.e., at some time in the future. In order to define $$VO_B^A(v_B),$$

the concept of Minkowski for summing two objects A and B, $A \oplus B$, is applied. See Hadwiger, Hugo, "Minkowskische Addition und Subtraktion beliebiger Punktmengen und die Theoreme von Erhard Schmidt." Math. Z., 53 (3): 210-218, doi:10.1007/BF01175656. If −A is the reflection of A in its reference point, and function $\lambda(p,v)=\{p+vt|t \geq 0\}$ defines a ray starting at point p and heading in the direction of v, then $$VO_B^A(v_B)$$

can be expressed by Eq. 1 as follows:

$$VO_B^A(v_B) = \{v_A \mid \lambda(p_A, v_A - v_B) \cap B \oplus -A\} \neq \emptyset \tag{1}$$

Figure 3A:
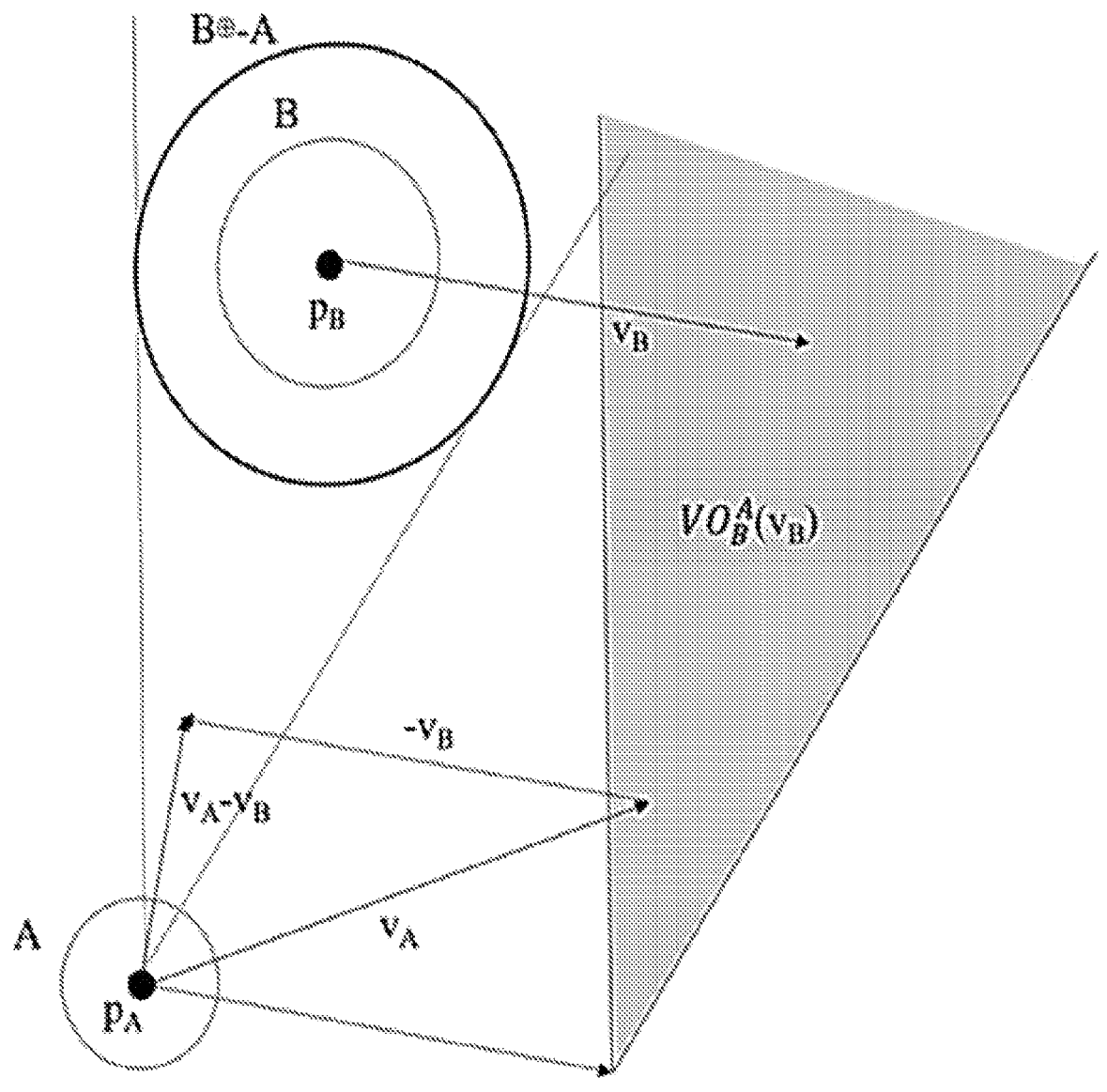
FIG. 3A is model of a robot and a velocity obstacle along with associated parameters.

Concisely, $$VO_B^A(v_B)$$

is a collision cone having an apex at $v_B$ as shown in FIG. 3A modeling relative positions and velocities of robot A and an obstacle B. In the modeling and while considering the size of obstacles, the radius of the obstacles is their original radius plus the radius of the robot such that in the final model, the robot is a point without sizes.

Physical Constraints

To avoid obstacles safely, robot A should select a safe motion that avoids of velocity obstacle $$VO_B^A(v_B).$$

The selected motion should be from a set of reachable and feasible safe motions. Specifically, robot A should move along under certain conditions set by the environment, e.g., road rules, and set by mechanical characteristics of the robot. Where robot A is a simple car-like robot in which (x,y) is a given position of the robot and θ is a given orientation of the robot at time t, the kinematic constraints for navigating the robot are expressed by Eq. 2 as follows:

$$\begin{cases} x'(t) = v(t)\cos\theta(t) \\ y'(t) = v(t)\sin\theta(t) \\ \theta'(t) = v(t)\dfrac{\tan\varphi(t)}{L} \end{cases} \tag{2}$$

according to LaValle, S. M., *Planning Algorithms*, Cambridge: Cambridge University Press 2006, the entirety of the disclosure of which hereby being incorporated by reference, where θ(t) is the angle between the velocity of the robot and the horizontal axis at time t; v and φ are the controls of the robot, i.e., the speed and rotation angle, respectively, of the robot; and L is the distance between the front and rear wheels of the robot. An expression for the position of the robot at time t under the assumption that the controls remain constant can be calculated by integrating Eq. 2. Based on the controls of the robot, a first physical constraint that will be imposed is the rotation angle φ. The robot A can be rotated clockwise or counterclockwise by some angle $\varphi \in [(0,2\pi)$ by mapping every $(x_A,y_A) \in A$ according to the correlation identified as (3) below:

$$(x_A, y_A) \rightarrow (x_A\cos\varphi - y_A\sin\varphi, x_A\sin\varphi + y_A\cos\varphi) \tag{3}$$

A second physical constraint that will be imposed is a road speed limit imposed by the governing law for road vehicles which may be expressed by Eq. 4 as follows:

$$(x - x_A)^2 + (y - y_A)^2 < (V\Delta t)^2 \tag{4}$$

wherein $x_A$ and $y_A$ are the respective coordinates of the current location of robot A and V is maximum allowed speed $(V_{max})$ for a given time step $\Delta t$. A third physical constraint that will be imposed is a maximum reachable acceleration while robot A is seeking a next motion to be made in which the maximum reachable acceleration is expressed by Eq. 5 as follows:

$$(x - x_v)^2 + (y - y_v)^2 < (a_A)^2 \tag{5}$$

wherein $x_v$ and $y_v$ are the respective coordinates of the current velocity and $a_A$ is calculated based on a maximum acceleration of the robot $a_{max}$ as $a_A=\frac{1}{2}a_{max}\times\Delta t^2$.

Other physical constraints can be added which will essentially reduce the reachable space of the robot. These constraints include but are not limited to the following: a maximum angular acceleration constraint, a non-holonomic kinematics constraint, a driving comfort related constraint such as a change of the acceleration constraint, and any other traffic rules related constraint such as a driving within a lane constraint.

Unlike holonomic agents, non-holonomic agents have fewer controllable degrees of freedom than total degrees of freedom and therefore cannot move with equal freedom in all directions. A differential drive robot is one example of a non-holonomic agent. Analytical solutions for a differential drive robot are described herein by way of example, but similar analytic solutions could be applied to other non-holonomic agents. For a typical differential drive robot, the two controllable degrees of freedom are the left and right wheel rotation velocity, $v_r$ and $v_l$, respectively. The kinematics model for such a robot may be expressed as the following:

$$\begin{cases} v = \dfrac{v_r + v_l}{2} \\ \omega = \dfrac{v_r - v_l}{L} \\ \theta = \theta_0 + \omega\Delta t \end{cases},$$

where v is the translational velocity of the robot, ω is the angular velocity of the robot, L is the distance between left and right wheels, $\theta_0$ is the previous heading direction of the agent, and θ is the updated heading direction after control cycle Δt. In this manner, a wheel velocity boundary may be mapped to an agent velocity boundary. The reachable velocity in x- and y-directions (i.e., $v_x$ and $v_y$) of the non-holonomic agent is determined by as follows:

$$\begin{cases} v_x = v * \cos(\theta_0 + \omega\Delta t) \\ v_y = v * \sin(\theta_0 + \omega\Delta t) \\ \theta = \theta_0 + \omega\Delta t \end{cases}.$$

ω is the angular velocity of the robot, L is the distance between left and right wheels, $\theta_0$ is the previous heading direction of the agent, and θ is the updated heading direction after control cycle Δt. In this manner, a wheel velocity boundary may be mapped to an agent velocity boundary.

The range of possible directional velocities within a given amount of time, or velocity boundary, for a holonomic agent can be plotted, as illustrated in the examples of FIG. 3A, as a circle around the agent. Unlike holonomic agents, the velocity boundary for a non-holonomic agent has a non-circular boundary as shown in the further examples of FIG. 3B.

The non-circular shape of the velocity boundary for a differential drive robot is a function of the robot's turning capabilities. If the rotation angle is constant, the reachable velocity profile, i.e., will be a rhombus since the translational velocity boundary will be linear along each of its sides. However, if the reachable angular velocity is not constant, and instead depends on a current angular velocity, different rotation angles per unit time will be possible depending on the state of the agent. If such rotation angle difference is nontrivial, the reachable velocity profile would have a nonlinear boundary.

Figure 3B:
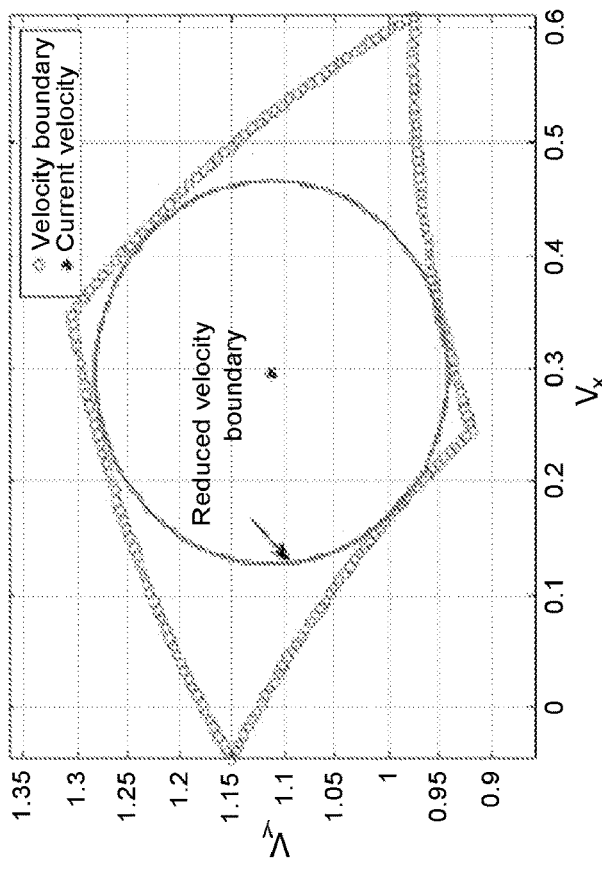
FIG. 3B are plots of velocity boundaries for two examples of acceleration models of non-holonomic agents.
Figure 3B:
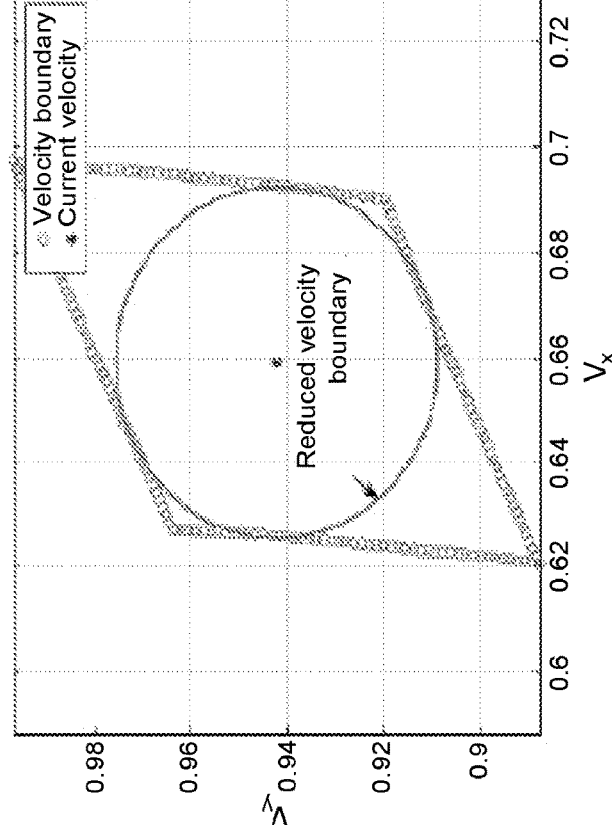

To apply the navigation solutions described elsewhere in this disclosure to non-holonomic agents, the movement of the non-holonomic agent can be constrained to force a circular velocity profile at a hardware or software level. As shown in FIG. 3B, a circular reduced velocity boundary can be determined within the non-holonomic agent's actual velocity boundary. Where the actual velocity boundary has linear or nearly linear sides as shown in the example presented on the left side of FIG. 3B, the radius of the reduced velocity boundary is determined by the shortest distance from the current velocity to any of the four sides of the actual velocity boundary. Where the lines are significantly non-linear, the radius of the reduced velocity boundary is determined iteratively with an optimization function as known to those skilled in the art.

By constraining the non-holonomic agent's movements to a circular reduced velocity boundary, the non-holonomic agent can be made functionally equivalent to a holonomic agent. Thus, approaches to navigation disclosed herein that assume that agents change their directional, i.e., x- and y-, velocities in a linearly proportional manner are equally applicable to holonomic agents and constrained non-holonomic agents.

New Velocity Setting

It is believed that only randomized motion planning may be adequate to provide collision avoidance capabilities within complex and/or highly dynamic environments, e.g., crowded crossings, in which controlled robot samples come arbitrarily close to any configuration of obstacles with a high probability as the complexity of the environment increases. As the computation time spent on collision checking of randomly selected obstacles is insufficient in such environments using the current velocity obstacle (VO) approach, robot motion planning and control process 100 as shown in FIG. 4 overcomes these limitations.

Figure 4:
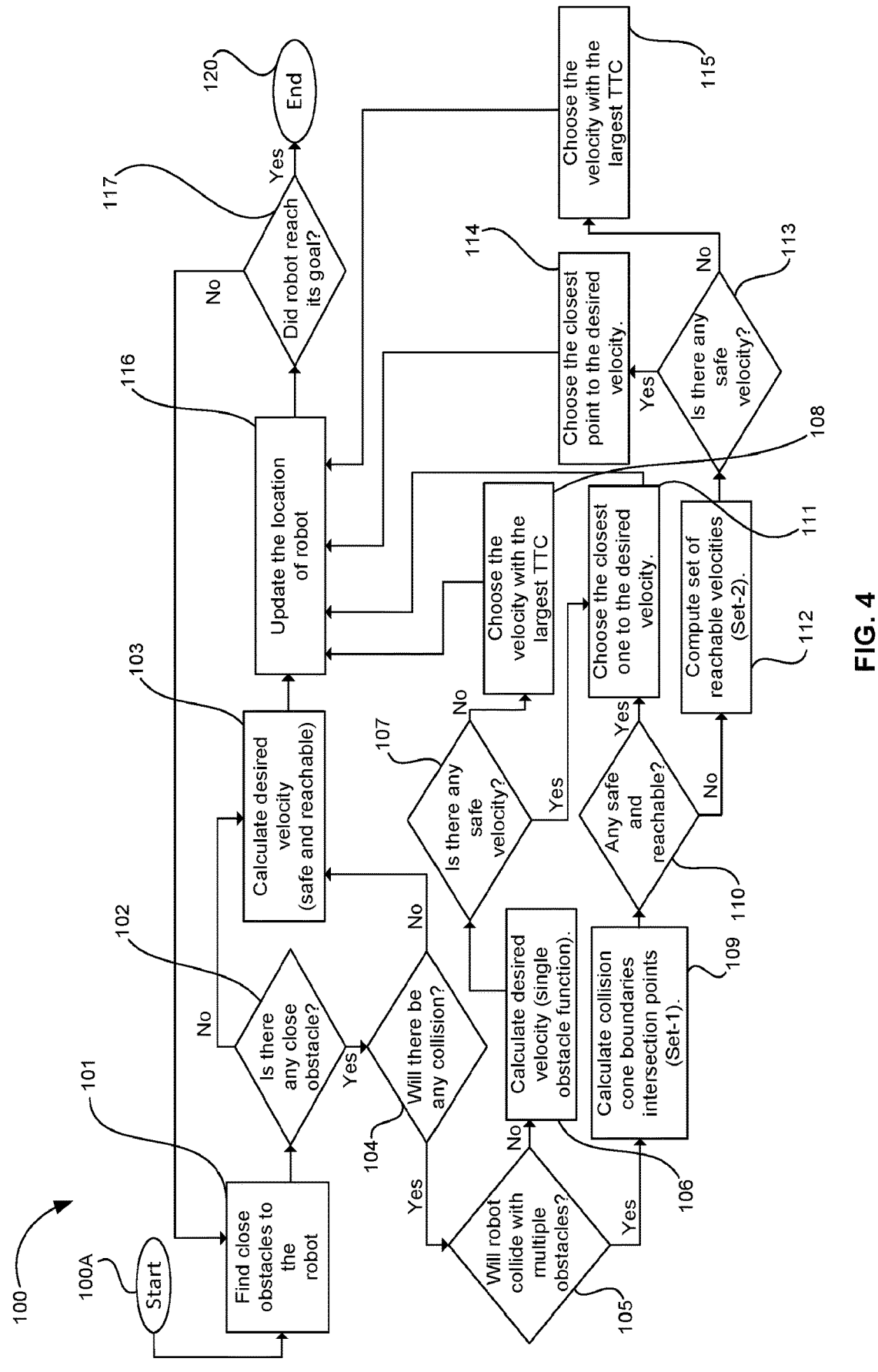
FIG. 4 is a process flow diagram of a robot motion planning and control process in accordance with an embodiment.
Figure 5A:
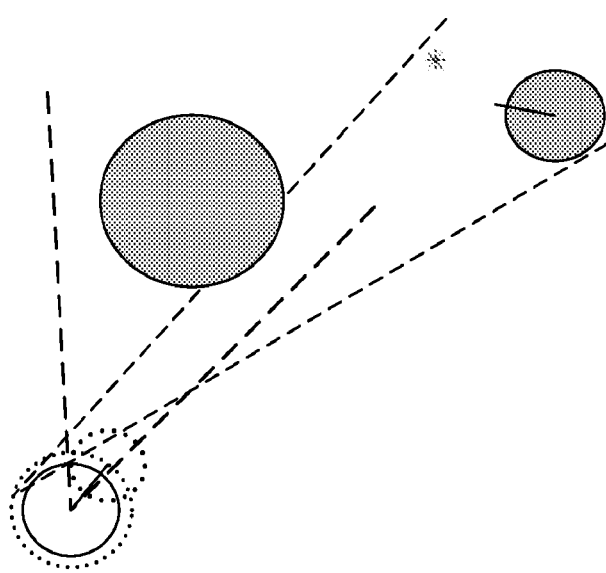
FIG. 5A is a model of an initial setup of another global environment that includes a robot and velocity obstacles along with collision cones associated with the obstacles as determined by the robot in accordance with another embodiment in which the robot will collide with a single obstacle.
Figure 5B:
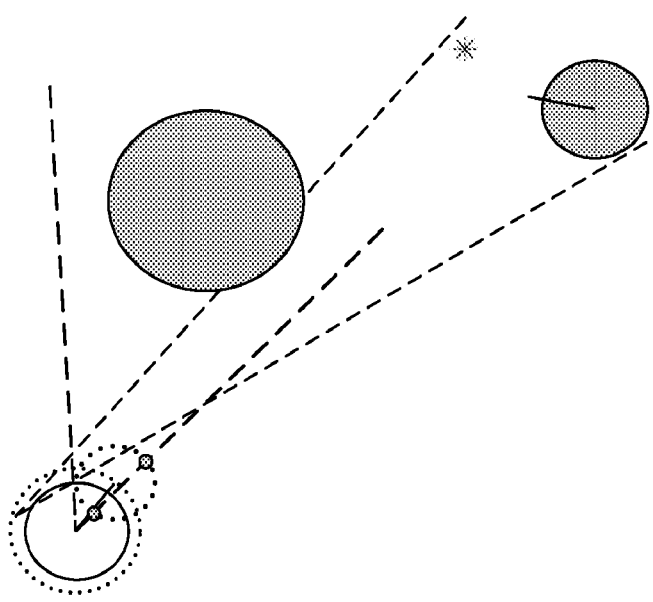
FIG. 5B is the model of FIG. 5A along with intersection points of colliding obstacle collision cone and the maximum reachable acceleration constraint as determined by the robot.
Figure 6A:
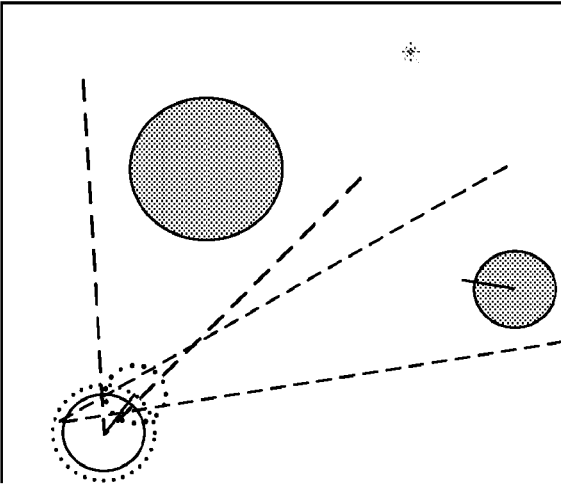
FIG. 6A is a model of an initial setup of another global environment that includes a robot and velocity obstacles along with collision cones associated with the obstacles as determined by the robot in accordance with another embodiment in which the robot will collide with multiple obstacles.
Figure 6B:
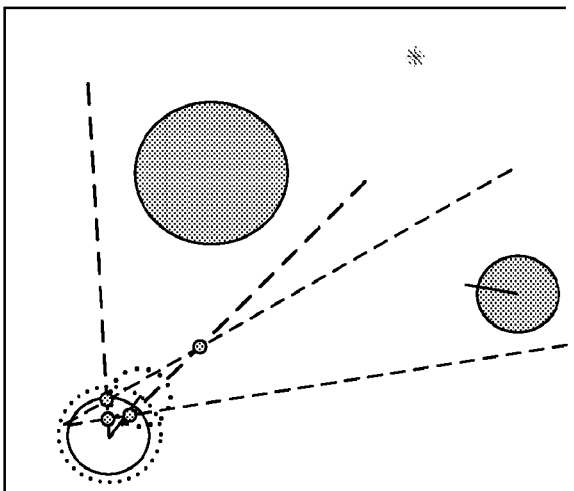
FIG. 6B is the model of FIG. 6A along with potential velocities based on intersection points of colliding obstacle collision cones.
Figure 6C:
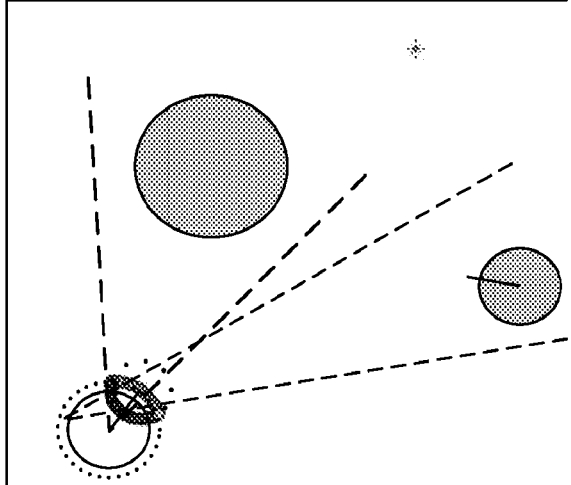
FIG. 6C is the model of FIG. 6A along with potential velocities on the common edges of maximum acceleration and maximum velocity constraints.
Figure 7A:
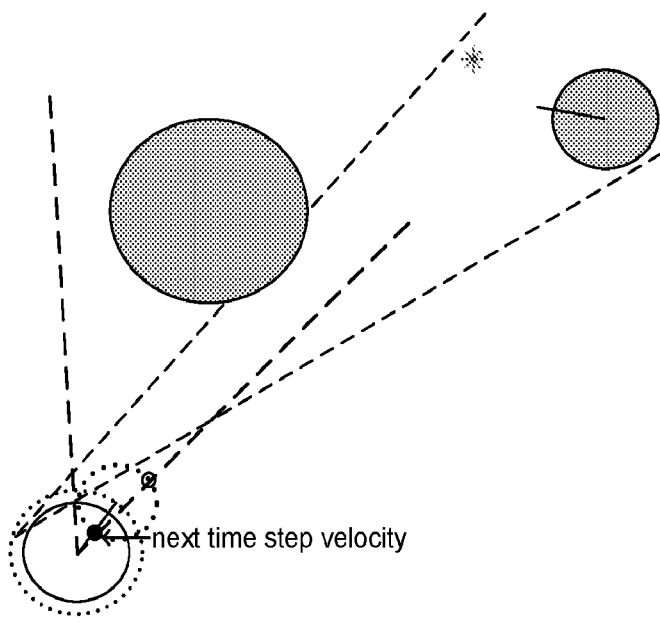
FIG. 7A is the model of FIG. 5A showing an exactly one potential velocity at a next time step.
Figure 7B:
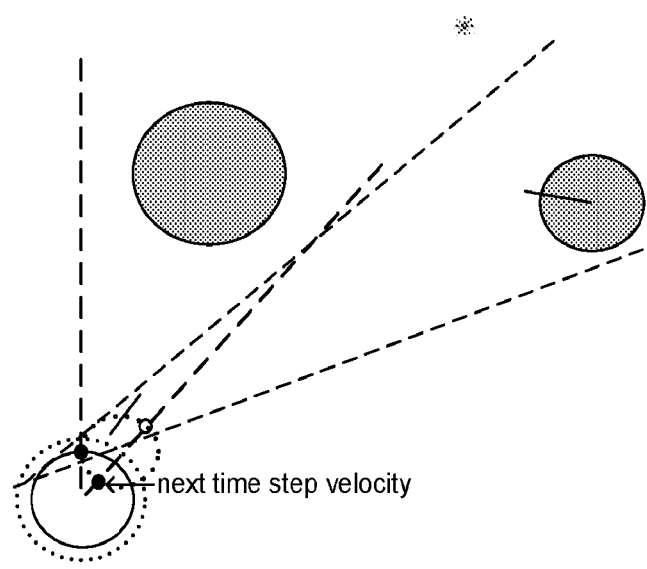
FIG. 7B is a modification of the model of FIG. 5A showing multiple potential velocities at a next time step.
Figure 8:
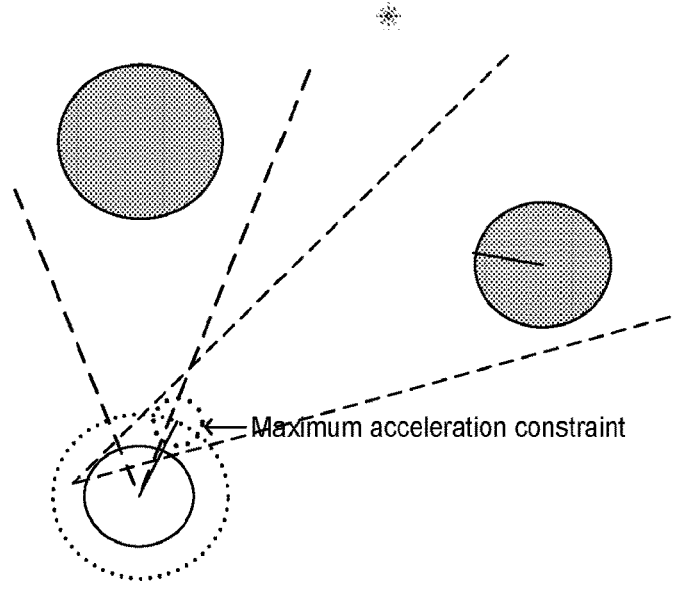
FIG. 8 is a modification of the model of FIG. 5A showing a maximum acceleration constraint in which there are no potential velocities when the robot will collide with the single obstacle.

Referring now to FIG. 4, upon initialization or at an arbitrary start time $t_0$ at a starting step 100A of robot A, at step 101 of process 100 at time $t_i$, robot A may seek the location and velocity of any obstacles in the sensing range of sensors of the robot, which may be but are not limited to being one or more Light Detection and Ranging (LiDAR) sensors to develop respective collision cones and/or collision cone boundaries relating to each of the identified obstacles, such as obstacles $O_1$-$O_5$ in the example of FIG. 2, and within the given physical constraints of the robot. At step 102, the robot may determine whether there are any sufficiently close obstacles which may be based on a preset level of closeness. If no obstacles are identified as being sufficiently close, then at step 103 a desired velocity of robot A may be calculated or otherwise set, e.g., via a microprocessor or a microcontroller, and the robot then may be actuated to move at a velocity corresponding to the desired velocity. Such desired velocity towards the goal destination of robot A may be based on the current position of the robot and the location of the goal destination, and must be reachable and safe.

If there are sufficiently close obstacles, at step 104, robot A may determine, e.g., via a microprocessor or a microcontroller, whether there will be a collision with any the identified obstacles. If not, robot A may proceed to step 103. If yes, at step 105, robot A may determine, e.g., via a microprocessor or microcontroller, whether the robot will collide with multiple obstacles at the current planned motion of the robot. If no, then at step 106, robot A may calculate, e.g., via a microprocessor or microcontroller, new velocity NewV corresponding to a possible new velocity of the robot by applying an algorithm for use when a collision with a single obstacle is determined to be imminent at the current planned motion of the robot. In this instance, at step 107, robot A may determine whether the calculated new velocity NewV is safe and if so, the robot may be actuated to move at a new velocity corresponding to NewV. which would correspond to the closest velocity to the desired velocity, and if no, then at step 108, robot A may choose a new velocity which gives the largest time to collision (TTC) at that instant in time. For a single obstacle collision, the largest TTC will force the robot to reduce the current velocity of the robot as much as possible, in which the TTC is calculated based on the ratio of the distance between the robot and the single obstacle to the relative velocity between the robot and the single obstacle.

If robot A determines that there will be a collision with multiple obstacles, then at step 109, robot A may calculate, e.g., via a microprocessor or microcontroller, intersection points of the developed collision cone boundaries of the identified obstacles to determine a set of potentially acceptable new velocities NewV$_i$, and at step 110, the robot may determine, via a microprocessor or microcontroller, whether any of the determined potentially acceptable new velocities NewV$_i$ are both safe and reachable by the robot by calculating safety and reachability indices. If any of the determined velocities NewV$_i$ are both safe and reachable to the goal destination by the robot, then at step 111, robot A, e.g., via a microprocessor or microcontroller, may select the closest velocity among such determined set of potentially acceptable new velocities NewV$_i$ to the desired velocity of the robot at that instant in time and accordingly be actuated to move at a velocity corresponding to the selected velocity among the determined set of potentially acceptable new velocities NewV$_i$. If none of the determined possible velocities NewV$_i$ are both safe and reachable, then at step 112 a set of reachable velocities closest to the desired velocity may be determined by robot A, and at step 113, the robot may determine velocities among the set of reachable velocities closest to the desired velocity that are safe, if any. If velocities among the set of reachable velocities closest to the desired velocity are safe, then at step 114, the robot A may select the velocity among such velocities that are closest to the desired velocity and accordingly be actuated to move at a velocity corresponding to the selected velocities among the velocities that are closest to the desired velocity. If none of the velocities among the set of reachable velocities closest to the desired velocity are safe, then at step 115, robot A may select a new velocity which gives the largest TTC at that instant in time. For multiple obstacle collision, the largest TTC will force the robot to reduce the current velocity magnitude as much as possible while choosing the collision obstacle being the furthest distance from the robot.

At step 116, robot A updates the location of the robot based on a global positioning unit attached to the robot or via a calculation of the new coordinates of the robot based on the immediately preceding location of the robot and the preceding velocity of the robot over the respective preceding time interval. At step 117 occurs at time $t_{i+1}$, robot A determines if its goal has been reached and the current iteration is over. If robot A has reached its goal, at step 120, then robot motion planning and control process 100 ends. Otherwise, robot A again may seek the location and velocity of any obstacles in the sensing range of the robot at step 101 and the remainder of the steps of process 100 are repeated as appropriate for the given conditions at that time and that position and velocity of the robot.

In the discussion noted above, the references to a microprocessor or microcontroller may be to the same or a different microprocessor or microcontroller. Additionally, the term goal destination may be a particular location or locations within a predetermined distance from or boundary around a particular location, e.g., in the neighborhood of a particular desired location.

Referring now to the particular examples shown FIGS. 5A-11, a robot moving towards a goal designated by an asterisk is shown by the white circle, obstacles to the robot are shown by the gray circles, and the dashed cone shapes are velocity obstacles. In the case of colliding with a single obstacle, the potential motions of the robot are the intersection points of colliding obstacle collision cone and maximum reachable acceleration constraint (Eq. 5) (FIG. 5B). However, if the robot will collide with multiple obstacles, its potential motions are Set-1 corresponding to the intersection points of colliding obstacles collision cones (FIG. 6B) and Set-2 corresponding to the velocities on the common edges of maximum acceleration and maximum velocity constraints (FIG. 6C).

Determining the new velocity has two major cases and some subcases. In both cases, the subcases discussed further herein may be useful to aid understanding.

In the first case, when the robot will collide with one obstacle, the subcases are as follows:

Subcase-1) there are one or more potential velocities which are intersection point(s) of colliding obstacle collision cone and maximum reachable acceleration constraint:

1-1) There is one potential reachable velocity (FIG. 7A): If this velocity is safe, this velocity will be considered as the next time step velocity. Otherwise, Subcase-2 will be considered in determining the next time step velocity.

1-2) There are multiple potential reachable velocities (FIG. 7B): Firstly, any safe candidate(s) is considered. If there is one safe candidate, it will be considered as the next time step velocity. In the situation of having multiple safe potential velocities, firstly the degrees of deviation from the desired velocity toward each of these potential velocities are calculated and then, the next time step velocity is selected as the velocity with minimum deviation from the desired velocity. Otherwise, Subcase-2 will be considered in determining the next time step velocity.

Subcase-2) There is no intersection point: If there is no potential velocity which is safe (FIG. 8), the speed will be reduced as much as possible in every time step until fully stop.

Figure 9A:
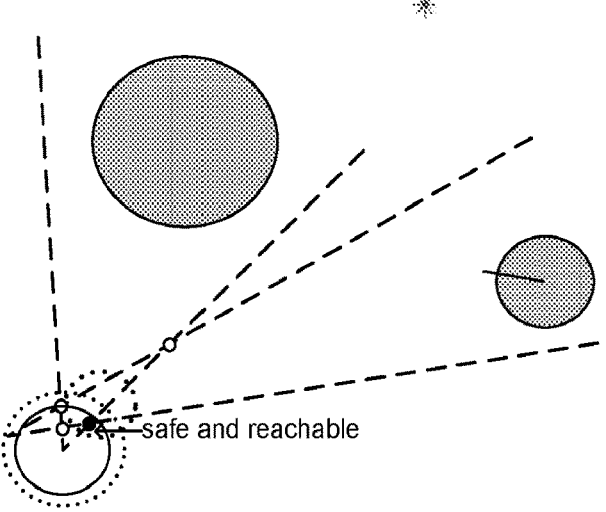
FIG. 9A is the model of FIG. 6A showing an exactly one potential velocity at a next time step which is safe and reachable.

In the second case, when the robot will collide with multiple obstacles, the following subcases should be considered:

Subcase-1) In Set-1, there are one or more potential velocities which are safe and reachable:

1-1) There is only one potential velocity which is safe and reachable: In such incident, this velocity will be considered as the next time step velocity (FIG. 9A).

Figure 9B:
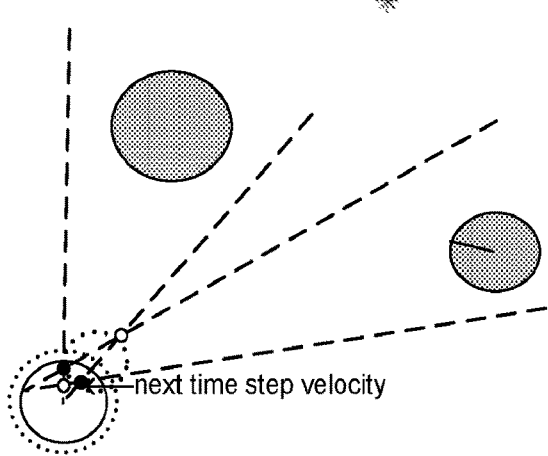
FIG. 9B is a modification of the model of FIG. 6A showing multiple potential velocities at a next time step which are safe and reachable.

1-2) There are multiple potential velocities which are safe and reachable: For this case, firstly the degrees of deviation from the desired velocity toward each of these potential velocities are calculated, and then, the next time step velocity is selected as the velocity with minimum deviation from the desired velocity (FIG. 9B).

Figure 10A:
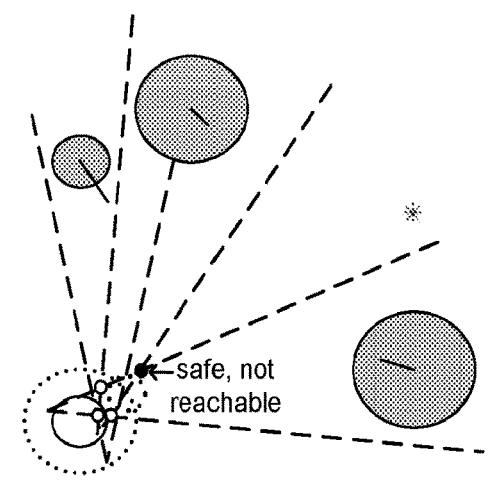
FIG. 10A is a modification of the model of FIG. 6A showing an exactly one potential velocity which is safe albeit not reachable.

Subcase-2) In Set-1, there are one or more potential velocities which are safe but not reachable:

2-1) There is only one potential velocity which is safe but not reachable: In this incident, the algorithm will consider a potential velocity from Set-2 (i.e., a reachable velocity) which is closest to this safe but not reachable velocity (FIG. 10A). If there is no safe motion in Set-2, subcase 2-3 will be considered.

Figure 10B:
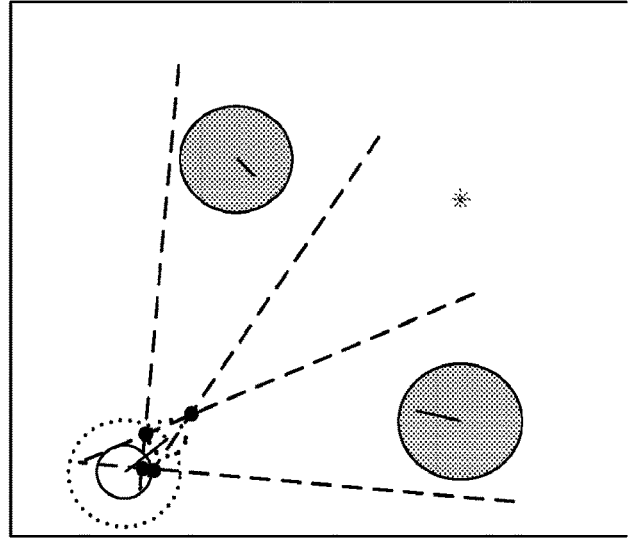
FIG. 10B is a modification of the model of FIG. 6A showing multiple potential velocities which are safe albeit not reachable.
Figure 11:
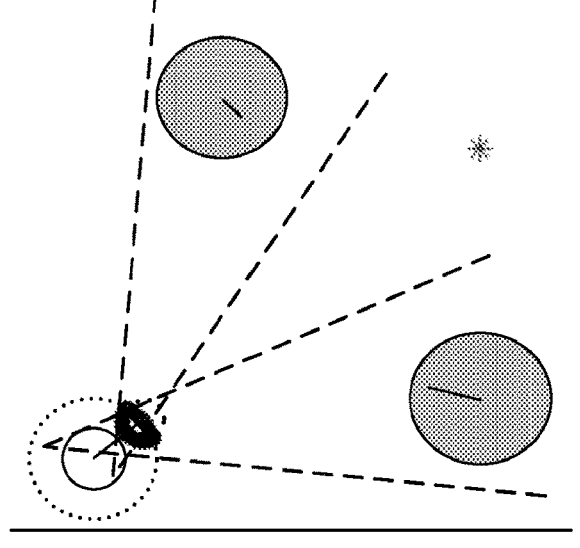
FIG. 11 is a modification of the model of FIG. 6A showing multiple potential velocities which are reachable albeit not safe.

2-2) There are multiple potential velocities which are safe but not reachable: For this case, a potential velocity from Set-2 (i.e., a reachable velocity) which is safe and closest to the desired velocity will be selected (FIG. 10B). The result is the same as subcase 2-1 in that if there is no safe motion in Set-2, subcase 2-3 will be considered.

2-3) If there is no potential velocity in set-2 which is safe (FIG. 11), the speed will be reduced as much as possible in every time step until the robot is at a complete stop. However, if the robot has enough safety distance from the obstacles, the robot will consider the desirable velocity for the next time step.

Subcase-3) In Set-1, there are one or more potential velocities which are not safe. If there is no potential velocity in set-2 which is safe, the speed will be reduced as much as possible in every time step until the robot is at a complete stop. Otherwise, the safe velocity in set-2 which is closest to the desired velocity will be selected.

It is to be understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the disclosure. Furthermore, although the disclosure herein has referred to particular features, it is to be understood that these features are merely illustrative of the principles and applications of the present invention. It is therefore to be understood that numerous modifications may be made to the illustrative embodiments and that other arrangements may be devised without departing from the spirit and scope of the present disclosure.

The invention claimed is:

1. A method of navigation by a first robot to a predetermined first location, comprising:
detecting a first set of velocity obstacles within a preset distance from the first robot by a first obstacle detection sensor of the first robot;
generating, via a first computer processor of the first robot and based on the first set of velocity obstacles detected, a first set of velocity candidates for the first robot based on detection of a first set of one or more velocity obstacles;
determining, via the first computer processor of the first robot, whether each of the first set of velocity candidates is a safe velocity for the first robot or an unsafe velocity for the first robot;
selecting, via the first computer processor, a first new velocity from the first set of velocity candidates; and
moving the first robot at a first velocity corresponding to the first new velocity,
wherein the first new velocity is a velocity candidate of the first set of velocity candidates corresponding to a first desired velocity when the first new velocity corresponds to a determined safe velocity for the first robot, and
determining one or more of the first set of velocity candidates are unsafe velocities for the first robot and, based on determining that each one of the first set of velocity candidates are unsafe velocities for the first robot, selecting the first new velocity as a minimum velocity associated with the first robot.

2. The method according to claim 1, wherein the first set of velocity candidates for the first robot is generated only when the first set of velocity obstacles detected includes more than one velocity obstacle.

3. The method according to claim 1, further comprising generating, via the first computer processor, a first set of reachable velocities for the first robot when each one of the first set of velocity candidates corresponds to a respective safe but unreachable velocity for the first robot, wherein the first new velocity is a velocity corresponding to a velocity candidate of the first set of velocity candidates, the corresponding velocity candidate being determined, via the first computer processor using a preset algorithm, to correspond to a velocity closest to the first desired velocity.

4. The method according to claim 1, further comprising:
detecting a location of the first set of velocity obstacles; and
determining, via the first computer processor, collision cones based on the location of the first set of velocity obstacles to ascertain the first set of velocity candidates.

5. The method according to claim 1, wherein the determination of whether each one of the first set of velocity candidates is safe and reachable by the first robot includes calculating, via the computer processor of the first robot, safety and reachability indices using preset algorithms.

6. The method according to claim 1, wherein the minimum velocity possible by the first robot is greater than zero.

7. The method according to claim 1, wherein at least one velocity obstacle of the first set of velocity obstacles of the velocity obstacles is a second robot identical or substantially identical to the first robot.

8. The method according to claim 1, wherein the first robot is an autonomous vehicle.

9. The method according to claim 8, wherein the autonomous vehicle is intended for travel on either one or both of roadways and other terrain.

10. The method according to claim 8, wherein the autonomous vehicle is intended for either one or both of air travel and sea travel.

11. The method according to claim 1, wherein the first robot is a first non-holonomic agent, and wherein the generating of the first set of velocity candidates comprises:
determining candidate sets of kinematic values each comprising a respective candidate translational velocity value, a respective candidate rotational velocity value, and a respective candidate angular value providing a possible directional heading for the first robot, each of the sets of kinematic values being based on a kinematics model for the non-holonomic agent; and
reducing the candidate sets of kinematic values to only such candidate sets of kinematic values reachable for the first robot if the first robot were a holonomic agent.

12. A robot collision avoidance system, the collision avoidance system comprising:
a first robot; and
a second robot configured to navigate to a predetermined second location, the second robot being a velocity obstacle from a first set of velocity obstacles and wherein the second robot is further configured, using a second computer processor, to:

generate a second set of velocity candidates for the second robot based on the detection of a second set of one or more velocity obstacles, the second set of velocity obstacles including the first robot and being within a preset distance from the second robot;

select a second new velocity from the second set of velocity candidates; and move the second robot at a velocity corresponding to the second new velocity, wherein the second new velocity is a second desired velocity when at least one velocity candidate of the second set of velocity candidates corresponds to a safe velocity for the second robot, and wherein the second new velocity is a minimum velocity associated with the second robot when each one of the second set of velocity candidates corresponds to a respective unsafe velocity for the second robot.

13. The robot collision avoidance system according to claim 12, wherein the first robot is a first non-holonomic agent, and the first robot is configured to generate a first set of velocity candidates using a first processor that is configured to:

determine candidate sets of kinematic values each comprising a respective candidate translational velocity value, a respective candidate rotational velocity value, and a respective candidate angular value providing a directional heading for the first robot, each of the sets of kinematic values being based on a kinematics model for the non-holonomic agent; and reduce the candidate sets of kinematic values to only such candidate sets of kinematic values reachable for the first robot if the first robot were a holonomic agent.

14. A method of navigation by a first robot to a predetermined first location, comprising:

detecting a first set of velocity obstacles from the first robot by a first obstacle detection sensor of the first robot, wherein the first set of velocity obstacles includes a plurality of velocity obstacles;

generating, via a first computer processor of the first robot and based on the first set of velocity obstacles detected, a first set of velocity candidates for the first robot based on detection of a first set of one or more velocity obstacles;

determining, via the first computer processor of the first robot, whether each of the first set of velocity candidates is a safe velocity for the first robot or an unsafe velocity for the first robot;

selecting, via the first computer processor, a first new velocity from the first set of velocity candidates; and moving the first robot at a first velocity corresponding to the first new velocity, wherein the first new velocity is a velocity candidate of the first set of velocity candidates corresponding to a first desired velocity when the first new velocity corresponds to a determined safe velocity for the first robot, and determining each of the first set of velocity candidates are unsafe velocities for the first robot and, based on determining that each one of the first set of velocity candidates are unsafe velocities for the first robot, associating the first new velocity with a minimum velocity associated with the first robot.

15. The method according to claim 14, wherein the first set of velocity candidates for the first robot is generated only when at least one velocity obstacle of the first set of velocity obstacles is detected to be within a preset distance from the first robot.

16. The method according to claim 14, wherein the determination of whether each one of the first set of velocity candidates is safe and reachable by the first robot includes calculating, via the computer processor of the first robot, safety and reachability indices using preset algorithms.

17. The method according to claim 14, wherein the first robot is an autonomous vehicle for land travel, an autonomous vehicle for air travel, or an autonomous vehicle for sea travel.

18. The method according to claim 14, wherein the first robot is a first non-holonomic agent, and wherein the generating of the first set of velocity candidates comprises:

determining candidate sets of kinematic values each comprising a respective candidate translational velocity value, a respective candidate rotational velocity value, and a respective candidate angular value providing a possible directional heading for the first robot, each of the sets of kinematic values being based on a kinematics model for the non-holonomic agent; and reducing the candidate sets of kinematic values to only such candidate sets of kinematic values reachable for the first robot if the first robot were a holonomic agent.

19. The method according to claim 14, wherein at least one velocity obstacle of the first set of velocity obstacles of the velocity obstacles is a second robot.

20. The method according to claim 19, wherein the second robot and first robot comprise autonomous vehicles.

* * * * *